T. J. KING.
SEED AND FERTILIZER DISTRIBUTER.
APPLICATION FILED NOV. 26, 1910.
997,299.
Patented July 11, 1911.
2 SHEETS—SHEET 1.
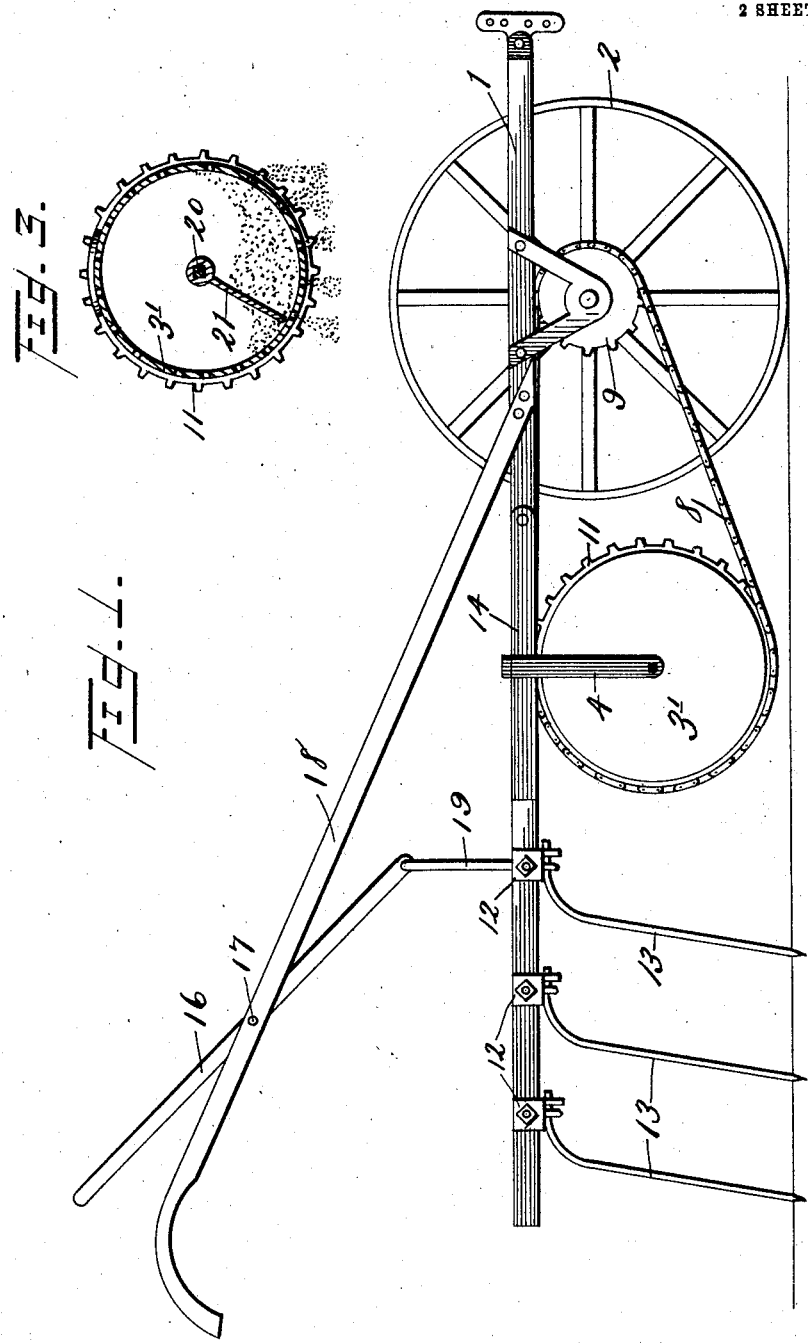
Witnesses
Inventor
Thomas J. King
By John P. Duffie
his Attorney T. J. KING.
SEED AND FERTILIZER DISTRIBUTER.
APPLICATION FILED NOV. 26, 1910.
997,299.
Patented July 11, 1911.
2 SHEETS—SHEET 2.
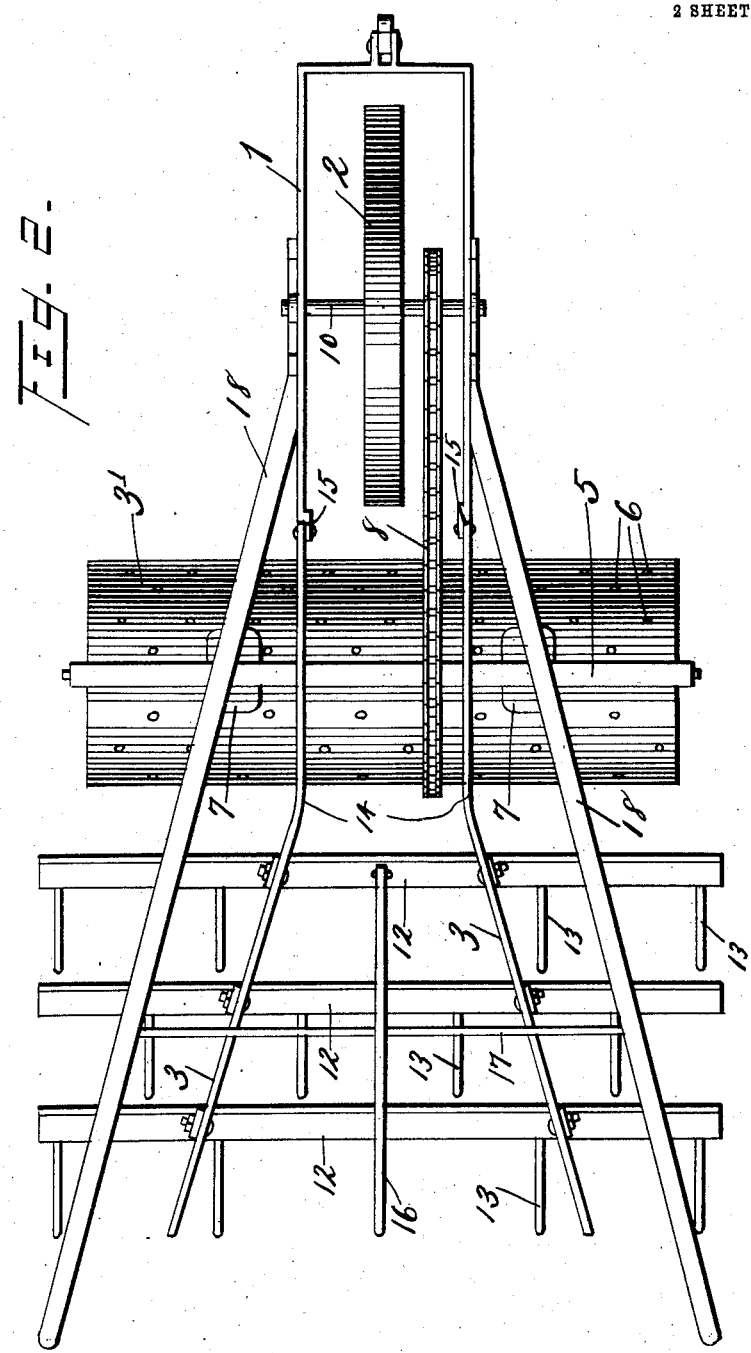
Witnesses
Inventor
Thomas J. King
his Attorney

UNITED STATES PATENT OFFICE.

THOMAS JOEL KING, OF RICHMOND, VIRGINIA.

SEED AND FERTILIZER DISTRIBUTER.

997,299. Specification of Letters Patent. Patented July 11, 1911.

Application filed November 26, 1910. Serial No. 594,311.

*To all whom it may concern:*

Be it known that I, THOMAS J. KING, a citizen of the United States, residing at Richmond, in the county of Henrico and State of Virginia, have invented certain new and useful Improvements in Seed and Fertilizer Distributers, of which the following is a specification.

This invention relates to a seed and fertilizer distributer for distributing seed and fertilizer of various kinds between the rows of the growing crop of cotton and corn.

The machine may be used for distributing cow peas, clover seed or anything of the kind evenly and accurately and for scratching in the seed at the same time.

With the foregoing and other objects in view, the invention consists in the novel features of construction, combination and arrangement of parts illustrated in the drawings and more particularly pointed out in the appended claim.

In the accompanying drawings in which like parts are designated by like characters throughout the several views;—Figure 1 is a side elevation of a distributer embodying my improvements. Fig. 2 is a plan view thereof, and Fig. 3 a transverse section taken through the distributing drum.

Referring to the drawings for a more particular description of the invention and which drawings are for illustrative purposes only and are therefore not drawn to scale, the device comprises the approximately U-shaped frame 1, mounted at the front upon the supporting wheel 2 and provided with the outwardly diverging rear end portions 3. A distributing drum $3^1$ is revolubly mounted between the depending legs 4 of the transversely disposed supporting or bearing bar 5 carried by the frame 1, and is provided in its periphery with suitable perforations 6 for distributing the seed or fertilizer and the latched doors 7 through which the seed or fertilizer is introduced into the drum. The drum is driven by a sprocket chain 8, passing over a sprocket wheel 9 on the axle 10 of the wheel 2 and a second sprocket wheel 11 on the drum. A series of three or more angle beams 12 are bolted to the rear end portions 3 of the frame 1, as shown and carry the harrow teeth 13 which are for the purpose of scratching the seed or fertilizer into the ground.

To provide for the raising of the harrow teeth above the ground at any time, the rear ends 14 of the frame 1 may be pivoted, as at 15, to the front portion of the frame, and a raising lever 16 pivoted intermediate its ends, on the bearing bar 17 extending between the handles 18 and connected at its lower end by the link 19 with the front angle beam 12. The shaft 20 upon which the drum $3^1$ is revolubly mounted may be provided with a series of fingers 21 to keep the seed or fertilizer in a constant state of agitation and thus prevent clogging in the drum.

From the foregoing description taken in connection with the drawings it is thought that the construction and operation of the invention will be readily understood without requiring a more extended explanation.

Various changes in the form, proportions and minor details of construction may be resorted to without departing from the principle or sacrificing any of the advantages of this invention as defined in the appended claim.

Having described my invention, what I claim as new and desire to secure by Letters Patent, is:—

A seed and fertilizer distributer of the class described comprising a supporting frame consisting of a front stationary section and a rear section consisting of a pair of outwardly diverging beams pivoted to the front section, a perforated seed and fertilizer distributing drum revolubly mounted beneath the pivoted rear section of the frame in rear of the supporting wheel, means for revolving said drum, three or more transverse series of harrow teeth attached to the pivoted rear section of the frame in rear of the drum for scratching the seed and fertilizer into the soil, handles attached to the stationary front section and means under the control of the operator for raising the pivoted rear section of the main frame and harrow teeth, said means comprising a raising lever pivoted to the handles and connected with said pivoted section.

In testimony whereof I affix my signature in presence of two witnesses.

THOMAS JOEL KING.

Witnesses:
C. H. WALLINGER,
L. H. HANCOCK.

Copies of this patent may be obtained for five cents each, by addressing the "Commissioner of Patents, Washington, D. C."